US006282891B1

(12) United States Patent
Rockwood

(10) Patent No.: US 6,282,891 B1
(45) Date of Patent: Sep. 4, 2001

(54) METHOD AND SYSTEM FOR CONTROLLING FLUID FLOW IN AN ELECTROHYDRAULIC SYSTEM HAVING MULTIPLE HYDRAULIC CIRCUITS

(75) Inventor: Brian D. Rockwood, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/421,185

(22) Filed: Oct. 19, 1999

(51) Int. Cl.[7] .................................................... F16D 31/02

(52) U.S. Cl. ............................................................ 60/422

(58) Field of Search .............................. 60/422, 426, 427

(56) References Cited

U.S. PATENT DOCUMENTS

| | | | |
|---|---|---|---|
| 4,706,456 * | 11/1987 | Backe et al. | 60/422 X |
| 4,712,376 * | 12/1987 | Hadank et al. | 60/427 |
| 4,759,183 * | 7/1988 | Kreth et al. | 60/422 |
| 4,856,278 * | 8/1989 | Widmann et al. | 60/426 X |
| 4,881,450 * | 11/1989 | Hirata et al. | 60/427 X |
| 4,967,557 * | 11/1990 | Izumi et al. | 60/426 X |
| 5,167,121 * | 12/1992 | Sepehri et al. | 60/422 |
| 5,214,916 * | 6/1993 | Lukich | 60/431 |
| 5,249,421 * | 10/1993 | Lunzman | 60/422 |
| 5,520,087 * | 5/1996 | Takamura et al. | 60/422 X |
| 5,553,452 * | 9/1996 | Snow et al. | 60/422 X |
| 5,623,093 | 4/1997 | Schenkel et al. . | |
| 5,762,475 | 6/1998 | Maddock et al. . | |
| 5,873,244 * | 2/1999 | Cobo et al. | 60/422 |
| 5,930,996 * | 8/1999 | Nakamura et al. | 60/426 |

* cited by examiner

*Primary Examiner*—John E. Ryznic
(74) *Attorney, Agent, or Firm*—Howard & Howard

(57) ABSTRACT

A method and system for controlling fluid flow from a hydraulic fluid supply via a single hydraulic pump in an electrohydraulic system having multiple hydraulic cylinders connected to the hydraulic pump and corresponding work implements includes input devices for generating input signals representative of a desired amount of movement of at least two of the work implements. A controller, coupled to the input devices and the cylinders, determines a scaling factor for each of the hydraulic circuits associated with each of the cylinders for compensating the hydraulic circuit for receiving less than maximum fluid flow from the pump. The controller also determines a desired percentage of fluid flow to each of the hydraulic circuits based on the desired amount of movement of the work implements and the corresponding scaling factors and controls the fluid flow from the fluid supply to each of the hydraulic circuits based on the desired percentages of fluid flow to allow for maximum fluid flow to each of the hydraulic circuits.

21 Claims, 4 Drawing Sheets

Fig-4-

H. C. #1

| C | Q | Q % |
|---|---|---|
| 1 | a | a/e x 100% |
| 2 | b | b/e x 100% |
| 3 | c | c/e x 100% |
| 4 | d | d/e x 100% |
| 5 | e | e/e x 100% |

Fig-5-

H. C. #2

| C | Q | Q % |
|---|---|---|
| 1 | f | f/j x 100% |
| 2 | g | g/j x 100% |
| 3 | h | h/j x 100% |
| 4 | i | i/j x 100% |
| 5 | j | j/j x 100% |

Fig-6-

H. C. #3

| C | Q | Q % |
|---|---|---|
| 1 | k | k/o x 100% |
| 2 | l | l/o x 100% |
| 3 | m | m/o x 100% |
| 4 | n | n/o x 100% |
| 5 | o | o/o x 100% |

Fig-7-

H. C. #4

| C | Q | Q % |
|---|---|---|
| 1 | p | p/t x 100% |
| 2 | q | q/t x 100% |
| 3 | r | r/t x 100% |
| 4 | s | s/t x 100% |
| 5 | t | t/t x 100% |

METHOD AND SYSTEM FOR CONTROLLING FLUID FLOW IN AN ELECTROHYDRAULIC SYSTEM HAVING MULTIPLE HYDRAULIC CIRCUITS

TECHNICAL FIELD

This invention relates generally to a method and system for controlling fluid flow in an electrohydraulic system and, more particularly, to a method and system for controlling the flow of fluid in an electrohydraulic system having multiple hydraulic circuits coupled to a single hydraulic pump.

BACKGROUND ART

Work machines such as wheel type loaders include work implements capable of being moved through a number of positions during a work cycle. Such implements typically include buckets, forks, and other material handling apparatus. Control levers are mounted at the operator's station and are connected to hydraulic circuits associated with each of the implements for moving the implements. The operator must manually move the control levers to open and close hydraulic valves that direct pressurized fluid from a hydraulic pump to hydraulic cylinders that in turn cause the implements to move.

Today, more and more hydraulic circuits are being driven electronically via a solenoid. That is, rather than be driven by fixed mechanical linkages, the hydraulic cylinders are driven by solenoids that are actuated via electronic signals from a microprocessor-controlled controller. Thus, the hydraulic cylinders are controlled via pre-programmed control logic. However, when changes are made to such an electrohydraulic system that affect flow characteristics, such as hose dimensions, orifice sizing, valve conversions, etc., the control logic must be revised accordingly in order to maximize fluid flow.

Accordingly, it is an object of this invention to provide a method and system that automatically calibrates software control in order to maximize hydraulic fluid flow to hydraulic cylinders in an electrohydraulic system.

The present invention is directed to overcome one or more of the problems as set forth above.

DISCLOSURE OF THE INVENTION

In one aspect of this invention, a method is provided for automatically controlling fluid flow in an electrohydraulic system having multiple hydraulic cylinders, each connected to a single hydraulic pump and a corresponding work implement and having at least two hydraulic circuits associated therewith for receiving the fluid from a supply and moving the cylinders accordingly. The method begins with determining a scaling factor for each of the hydraulic circuits for compensating the hydraulic circuit for receiving less than maximum fluid flow from the pump. An input signal is received representing a desired amount of movement of at least two of the work implements, and a desired percentage of fluid flow to each of the hydraulic circuits associated with each of the cylinders is determined based on the desired amount of movement of the work implements and the scaling factor of the corresponding hydraulic circuits. Finally, the amount of fluid flow from the fluid supply to each of the hydraulic circuits is controlled based on the corresponding desired percentage of fluid flow so as to allow for maximum fluid flow to each of the hydraulic circuits.

In another aspect of the invention, a system is provided for carrying out the steps of the above-described method. The system includes a hydraulic fluid supply coupled to a plurality of hydraulic cylinders via a single hydraulic pump. Each of the cylinders are coupled to corresponding work implements, and have at least two hydraulic circuits associated therewith for receiving the fluid supply and moving the cylinders accordingly. The system further includes at least two input devices for generating at least two corresponding input signals representative of a desired amount of movement for at least two of the work implements. The system also includes a controller, coupled to each of the input devices and each of the cylinders, for determining a scaling factor for each of the hydraulic circuits for compensating the hydraulic circuit for receiving less than maximum fluid flow from the pump, determining a desired percentage of fluid flow to each of the hydraulic circuits associated with each of the cylinders based on the desired amount of movement of the work implements and the scaling factor of the corresponding hydraulic circuits, and for controlling the amount of fluid flow from the hydraulic fluid supply to each of the hydraulic circuits based on the corresponding desired percentage of fluid flow.

BRIEF DESCRIPTION OF THE DRAWINGS

FIGS. 4–7 are illustrative tables of fluid flows for four hydraulic circuits.

BEST MODE FOR CARRYING OUT THE INVENTION

Figure 1:
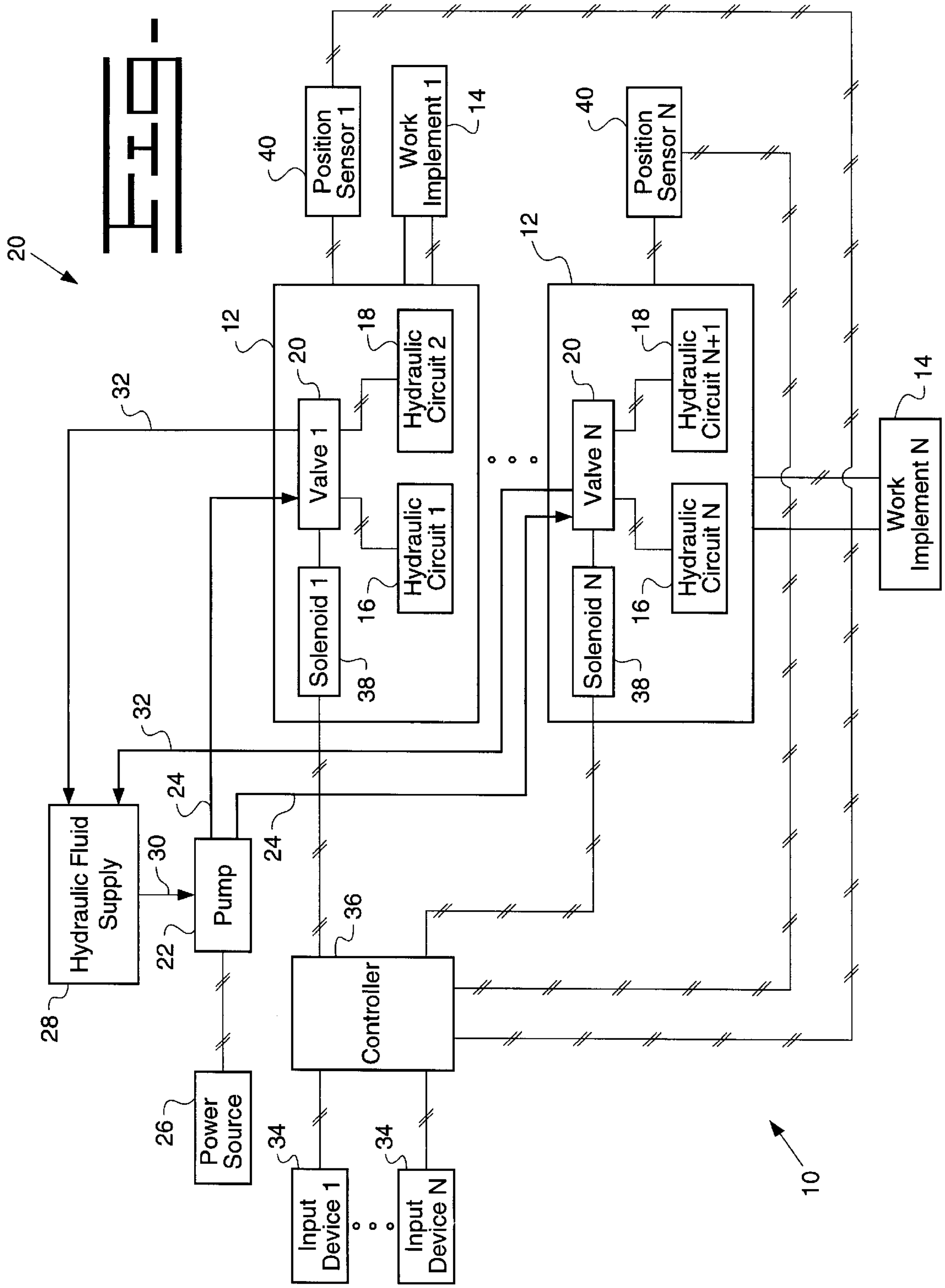
FIG. 1 is a block diagram of an electrohydraulic control system according to the present invention.

Turning now to FIG. 1, there is shown a schematic block diagram of the electrohydraulic system of the present invention, denoted generally by reference numeral 10. The system 10 includes hydraulic cylinders 12 coupled to their corresponding work implements 14. Although only two cylinders 12 and corresponding work implements 14 are shown, the present invention applies to electrohydraulic systems employing a plurality of cylinders 12 and work implements 14.

Each of the cylinders 12 include a first hydraulic circuit 16 and a second hydraulic circuit 18, such as a head side and a rod side, for extending and retracting the cylinder 12. Activation of either circuit 16, 18 is controlled via movement of a valve 20, such as a spool valve. As the valve 20 moves in one direction or another, more fluid flows to one hydraulic circuit or the other, resulting in more movement in either the extending or retracting position.

The valves 20 are each coupled to a single hydraulic pump 22 via fluid inlets 24. The hydraulic pump 22, powered by a power source 26, such as a battery, pumps hydraulic fluid from a hydraulic fluid supply 28 through supply inlet 30 into each of the cylinders 12 via the fluid inlets 24. Each of the valves 20 is also coupled to hydraulic fluid supply 28 via fluid outlets 32 for returning the hydraulic fluid back to the hydraulic fluid supply 28.

Thus, extension and retraction of the cylinders 12 is controlled via the amount of hydraulic fluid passed by the valve 20 to the first and second hydraulic circuits 16, 18. The amount of fluid flow into each of the cylinders is determined based on the desired movement of each of the work implements 14, which is governed by the amount of motion applied to input devices 34 by a user. Input device 34 may be a joystick, lever, or any other similar device or combination of these type of devices.

Rather than being mechanically linked directly to the cylinders 12, the input devices 34 are coupled to a controller 36 having control logic programmed therein, which is in turn coupled to a solenoid 38 associated with each of the valves 20. Controller 36 controls the amount and polarity of current applied to each solenoid 38 thereby controlling movement of each of the valves 20. Positions sensors 40 are coupled to each of the cylinders 12 for sensing the position of the cylinder 12 and generating a position signal for receipt by controller 36. Controller 36 utilizes the position information in controlling the movement of the valves 20 via the solenoids 38, as will be described in greater detail below.

Figure 2:
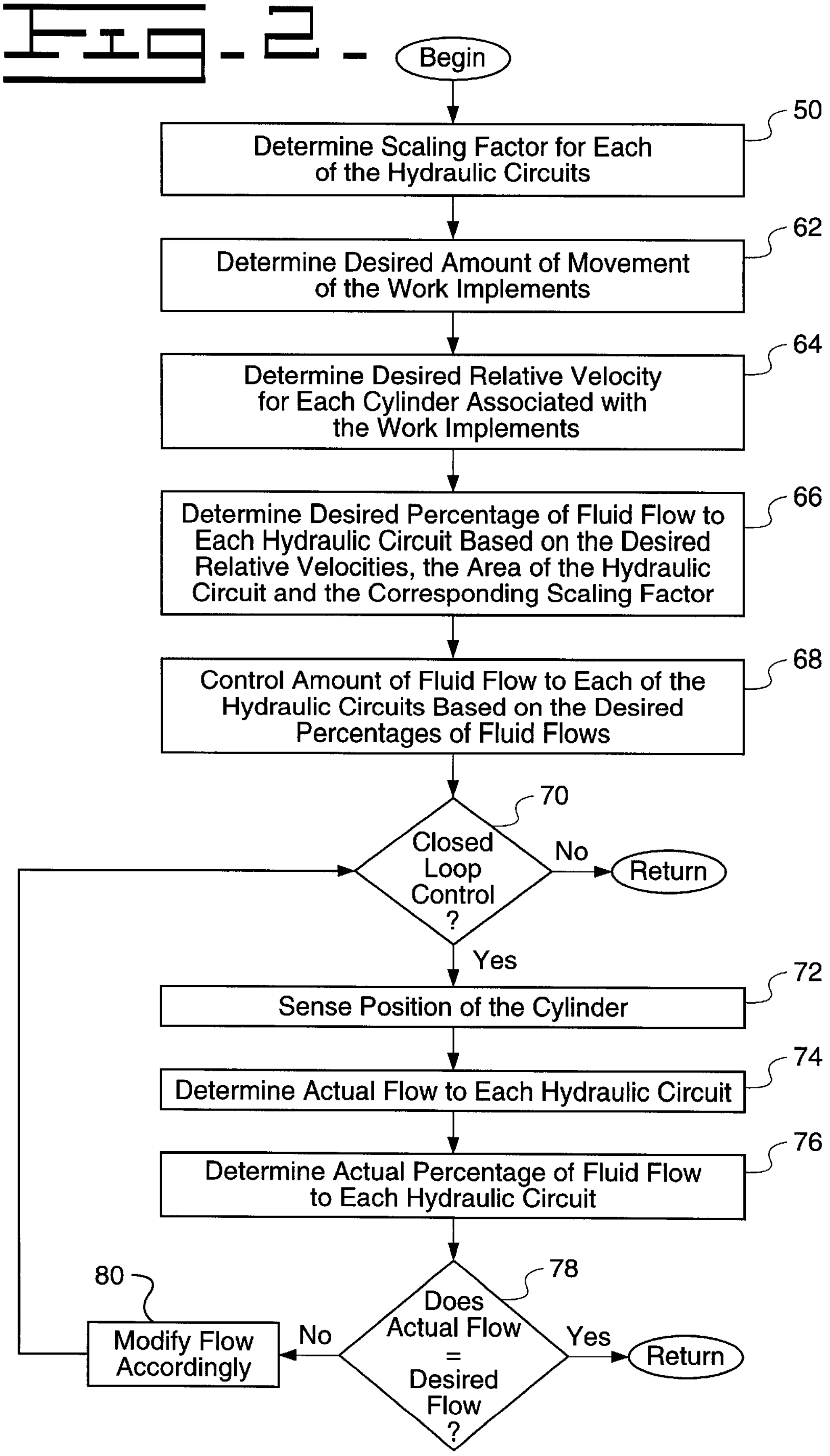
FIG. 2 is a flow diagram illustrating the general steps associated with the control portion of the method of the present invention.

FIG. 2 is a flow diagram illustrating the general steps associated with the control portion of the method of the present invention. First, the controller 36 automatically calibrates the electrohydraulic system 10 by determining a scaling factor for each of the hydraulic circuits 16, 18, as shown at block 50. This scaling factor is later applied when determining a desired fluid flow to each of the hydraulic circuits 16, 18 to compensate the hydraulic circuits for receiving less than maximum fluid flow from the one pump 22.

Figure 3:
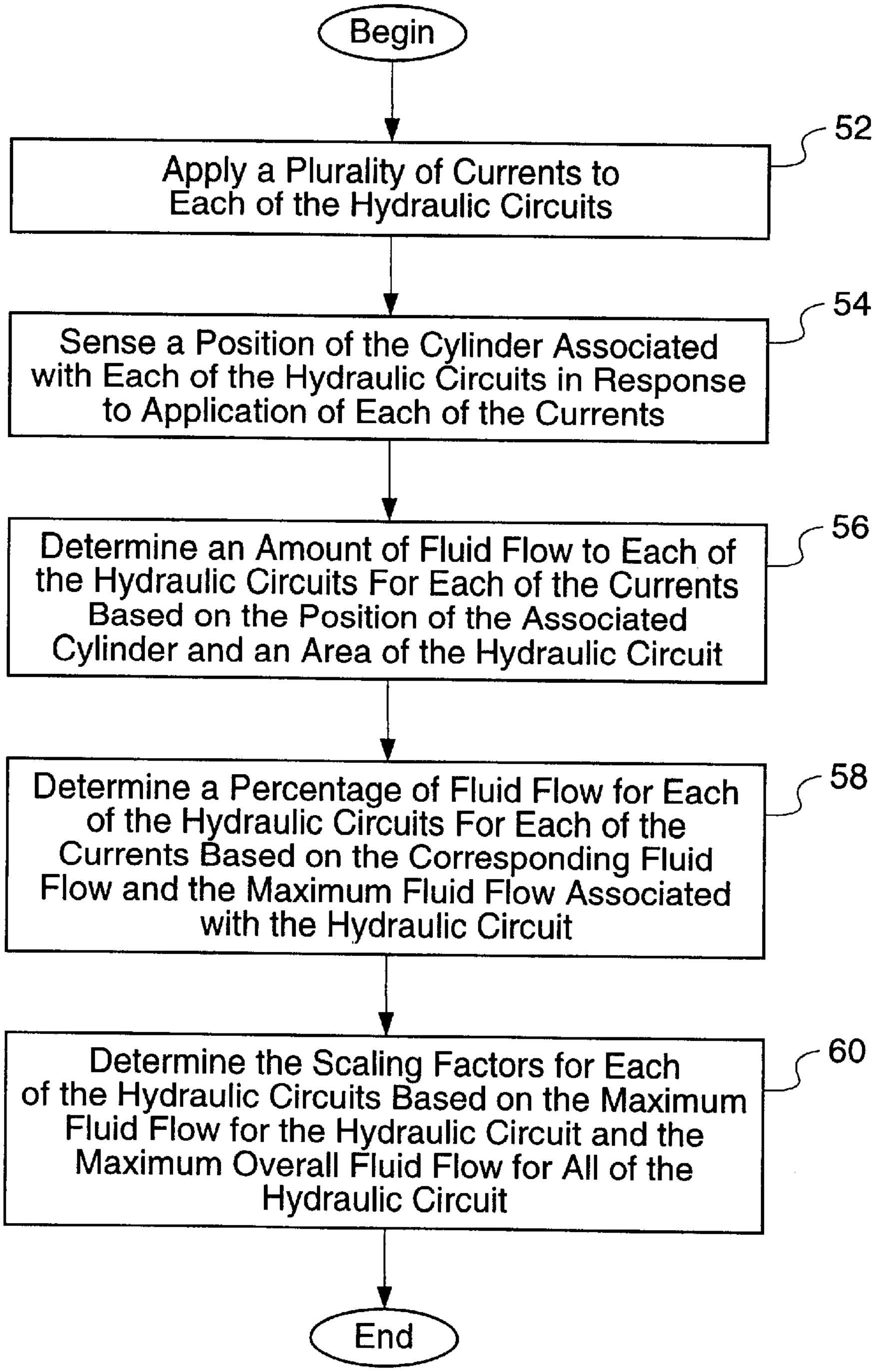
FIG. 3 is a flow diagram illustrating the general steps associated with the calibration portion of the method of the present invention.

The steps performed in determining the scaling factors are illustrated in the flow diagram shown in FIG. 3. First, a plurality of fluid flows for each of the hydraulic circuits is determined representative of the amount of fluid flowing into the hydraulic circuit in response to various different currents applied to the solenoid 38, as illustrated at blocks 52–56. To obtain the fluid flows, a plurality of currents are applied to each of the hydraulic circuits 16, 18 via the associated solenoids 38, as shown at block 52. The currents are preferably ramped up within a predetermined current range and ramped down, or reversed in polarity, to account for movement of the valve 20 in both directions.

In response to the application of each of the currents, the position of the corresponding cylinder 12 is sensed via the cylinder's position sensor 40, as shown at block 54. Position sensor 40 transmits the position information to the controller 36 for processing. From this information, controller 36 can then determine the amount of fluid flowing into each of the hydraulic circuits 16, 18.

This is accomplished by first differentiating the position information to obtain a velocity signal, V, for the cylinder 12 at each current value, C. That velocity signal, V, is then multiplied by the area, A, of the corresponding hydraulic circuit 16, 18 to obtain a fluid flow value, Q. That is, $Q=V\times A$. Thus, for each current value, C, a corresponding fluid flow, Q, is determined based on the differentiated position signal and the area. FIGS. 4–7 are tables illustrative of the type of flow mapping that is performed to obtain the fluid flows for each of the hydraulic circuits. Although application of five current values is illustrated in FIGS. 4–7, it should be appreciated that the present invention is not limited to only five current values but may be more or less, depending on the application.

At this time, an averaging of some of the fluid flows may be done to account for hysteresis associated with the valves 20. That is, upon an initial increase in current, the valve 20 is sluggish in opening, and the same is true during an initial decrease in current. Thus, the fluid flows may be averaged over two or more of the currents that is indicative of the valve 20 opening and/or closing. For example, in FIG. 4, fluid flows a and b may be averaged to obtain a new fluid flow associated with current C=1.

Upon determining all of the fluid flows for each of the hydraulic circuits 16, 18, the method proceeds to determine corresponding percentages of fluid flows, Q%, as shown at block 58. Each of the fluid flows are divided by the maximum fluid flow for that hydraulic circuit and multiplied by 100. For example, the maximum fluid flow for hydraulic circuit ("H. C.") #1 in FIG. 4 is Q=e at C=5. Thus, each of the fluid flows is divided by e and then multiplied by 100% to determine a corresponding percentage of fluid flow.

Finally, the scaling factors are determined, block 60, based on the maximum fluid flows. Each of the maximum fluid flows are compared to the maximum fluid flow of all the hydraulic circuits to obtain a ratio indicative of the percentage of maximum flow each hydraulic circuit receives. For example, if the maximum flow for each of the circuits shown in FIGS. 4–7 are e, j, o, and t, respectively, and o is the highest amount of fluid flow out of all of the fluid flows, the scaling factor is determined by dividing o by e, j, and t to get the scaling factor for H. C. #1, H. C. #2, and H. C. #4, respectively. Of course, the scaling factor for H. C. #3, is 1.0 since it receives maximum flow.

Now that the scaling factors are determined, the controller 36 utilizes these factors in modifying input commands to each of the hydraulic circuits 16, 18. Returning now to FIG. 2, the method proceeds to determine a desired amount of movement for the work implements 14, as shown at block 62, in determining the appropriate input commands to the cylinders 12. This is accomplished by receiving and processing input commands transmitted by input devices 34 associated with each of the work implements 14.

According to a predetermined algorithm stored in controller 36, controller 36 determines desired velocities for moving each of the cylinders 12 associated with the work implements 14. However, since more than one work implement 14 is being moved at one time and only one pump 22 is available to supply the fluid flow, controller 36 determines a relative motion, or velocity, for moving each of the cylinders 12, as shown at block 64. This relative velocity is determined by dividing each of the desired velocities by the sum of all the desired velocities.

From the desired relative velocity to be applied to each cylinder 12, controller 36 determines a desired percentage of fluid flow to each of the hydraulic circuits, as shown at block 66. Again, the desired percentage of fluid flow can be determined by multiplying the relative velocity by the area of the hydraulic circuit.

The controller 36 then controls the fluid flow to each of the circuits based on the desired percentage of fluid flow, as shown at block 68. This is accomplished utilizing the tables shown in FIGS. 4–7. For example, if the desired percentage of fluid flow to H. C. #1 equals (b/e) ×100%, then controller 36 applies current C=2 to the appropriate solenoid 38. If the desired percentage of fluid flow does not exactly match any of the percentages of fluid flow in the table, controller 36 performs an interpolation to determine the desired amount of current.

The method can proceed to perform closed loop control if desired, as shown at conditional block 70. In closed loop control, controller 36 uses the position information from position sensor 40 to update the current command to the solenoids 38, as shown at block 72. From the position signal, an actual flow to 30 the hydraulic cylinder, block 74, is determined by differentiating the position signal to determine the velocity of the cylinder, and multiplying that velocity by the area of the hydraulic circuit.

The actual fluid flow to each of the hydraulic circuits is converted into an actual percentage of fluid flow by dividing each of the actual fluid flows by the sum of all the fluid flows, as shown at block 76. The actual percentage of fluid flow for each hydraulic circuit is then compared with its corresponding desired percentage of fluid flow, as shown at conditional block 78, to determine if there is a difference. If so, controller 36 then increases or decreases the amount of current applied to the solenoids 38 of the hydraulic circuits not receiving the desired percentage of fluid flow, as shown at block 80.

Of course, various modifications of this invention would come within the scope of the invention. The main fundamental concept is to automate calibration of an electrohydraulic system to determine current to flow percentage mapping for each hydraulic circuit in the system and to determine a scaling factor, or handicap, to be applied to those circuits that only get a fraction of maximum fluid flow.

INDUSTRIAL APPLICABILITY

The present invention is advantageously applicable in controlling the flow of fluid in an electrohydraulic system 10 having only one hydraulic pump 22 coupled to a plurality of cylinders 12 as in construction machinery. Each of the cylinders 12 have at least hydraulic circuits 16, 18 associated therewith for receiving the fluid and moving the cylinder 12 correspondingly. Each of the cylinders 12 has a valve 20 coupled to the associated hydraulic circuits 16, 18 and the pump 22. Furthermore, each of the valves 20 are coupled to a solenoid 38 that moves the valve 20 to allow for fluid flow into one of the hydraulic circuits 16, 18. The following description is only for the purposes of illustration and is not intended to limit the present invention as such. It will be recognizable, by those skilled in the art, that the present invention is suitable for a plurality of other applications.

The present invention begins by calibrating the electrohydraulic system 10 to determine scaling factors for each of the hydraulic circuits 16, 18 in each of the cylinders 12. The scaling factors are applied to input commands to the hydraulic circuits 16, 18 to compensate for the hydraulic circuit 16, 18 receiving only a fraction of maximum fluid flow. The scaling factor is determined by stepping through a current range of the solenoid 38 and measuring steady state velocity of the cylinder 12 as it moves in response to application of the currents. Maps of current to fluid flows and percentages of fluid flows are then generated for each of the hydraulic circuits 16, 18. The scaling factor for each hydraulic circuit is then determined by comparing the maximum fluid flow of the hydraulic circuit with the maximum fluid flow of all of the hydraulic circuits.

Then, in operation, the controller 36 determines an input command to be applied to each of the cylinders 12 via the solenoid 38 to achieve a desired movement velocity. The desired movement velocity is determined based on the amount of movement applied to the input devices 34. The desired velocity is converted into a relative velocity to account for the single pump 22 pumping fluid to all of the hydraulic circuits 16, 18.

After determining the desired relative velocity, a desired percentage of fluid flow to each hydraulic circuit 16, 18 is determined based on the area of the hydraulic circuits 16, 18. Controller 36 then applies a current to the solenoids according to the previously determined mappings to obtain the desired percentage of fluid flow to each of the hydraulic circuits 16, 18.

Closed loop control can be achieved by determining the actual flow of fluid to each of the hydraulic circuits 16, 18 via the position of the cylinder 12 as sensed by position sensor 40. The actual flow is determined according to the position signal and the area of the hydraulic circuit 16, 18. If the actual fluid flow does not agree with the desired fluid flow, controller 36 modifies the amount of current applied to the solenoids 38 accordingly.

Other aspects, objects and advantages of this invention can be obtained from a study of the drawings, the disclosure and the appended claims.

What is claimed is:

1. A method for controlling fluid flow from a hydraulic fluid supply (28) via a single hydraulic pump (22) in an electrohydraulic system having multiple hydraulic cylinders (12) each connected to the hydraulic pump (22) and a corresponding work implement (14), wherein each of the cylinders (12) have at least two hydraulic circuits (16,18) for receiving the fluid supply (28) and moving the cylinders (12), the method comprising:

- determining a scaling factor (50) for each of the hydraulic circuits (16,18) for compensating the hydraulic circuit (16,18) for receiving less than maximum fluid flow from the pump (22) wherein the determination of the scaling factor includes averaging of fluid flows at selected input conditions for each of the hydraulic circuits (16,18) to account for hysteresis associated with the hydraulic circuit (16,18);
- receiving an input signal (62) representative of a desired amount of movement of at least two of the work implements (14);
- determining a desired percentage of fluid flow (66) to each of the hydraulic circuits (16,18) associated with each of the cylinders (12) based on the desired amount of movement of the work implements (14) and the scaling factor of the corresponding hydraulic circuits (16,18); and
- controlling the amount of fluid flow (68) from the hydraulic fluid supply (28) to each of the hydraulic circuits (16,18) based on the corresponding desired percentage of fluid flow so as to allow for maximum fluid flow to each of the hydraulic circuits (16,18).

2. The method as recited in claim 1 wherein determining each of the scaling factors comprises:

- determining a plurality of fluid flows corresponding to a plurality of current values for each of the hydraulic circuits;
- determining a maximum fluid flow for each hydraulic circuit from the plurality of fluid flows and a maximum overall fluid flow from all of the maximum fluid flows of all the hydraulic circuits; and
- determining the scaling factor for each of the hydraulic circuits based on the maximum fluid flow for the corresponding hydraulic circuit and the maximum overall fluid flow.

3. The method as recited in claim 2 wherein each of the hydraulic circuits (16,18) has a known area, and wherein determining the plurality of fluid flows comprising:

- applying the plurality of currents (52) to each of the hydraulic circuits (16,18), each of the currents having a different value;
- sensing a position (54) of the cylinder (12) associated with each of the hydraulic circuits (16,18) in response to application of each of the currents; and
- determining the plurality of fluid flows (56) associated with each of the currents based on the position of the associated cylinder (12) and the known area of the hydraulic circuit (16,18).

4. The method as recited in claim 2 wherein determining the scaling factor includes determining a percentage of fluid flow for each of the fluid flows based on the maximum fluid flow for each of the hydraulic circuits, and wherein controlling the amount of fluid flow to each of the hydraulic circuits includes applying a current to the hydraulic circuit based on the desired percentage of fluid flow and the current values associated with each of the determined percentages of fluid flows.

5. The method as recited in claim 1 wherein each of the hydraulic circuits have a known area and wherein determining the desired percentage of fluid flow comprises:

determining a desired relative velocity for each of the cylinders to be moved based on the desired amount of movement of the work implements; and determining each of the desired percentages of fluid flow based on each of the relative velocities and the known area of each of the hydraulic circuits associated with the cylinders.

6. The method as recited in claim 5 wherein determining each of the desired relative velocities comprises:

determining a desired velocity for moving each of the cylinders associated with the work implements based on the desired amount of movement; and determining the relative velocities based on each of the desired velocities and a total desired velocity for moving all of the cylinders.

7. The method as recited in claim 1 wherein controlling the amount of fluid flow further comprises:

sensing a position of each of the cylinders as they move; and controlling the amount of fluid flow based on the position of each of the cylinders and the desired percentage of fluid flow to each of the hydraulic circuits associated with the cylinders.

8. The method as recited in claim 7 wherein controlling the amount of fluid flow further comprises:

determining an actual flow of fluid to each of the hydraulic circuits based on the position of the cylinders;

determining an actual percentage of fluid flow to each of the hydraulic circuits based on the actual flow and the total fluid flow to all of the hydraulic circuits; and comparing the actual percentage of fluid flow of each of the hydraulic circuits with the corresponding desired percentage of fluid flow.

9. A method for controlling fluid flow from a hydraulic fluid supply (28) via a single hydraulic pump (22) in an electrohydraulic system having multiple hydraulic cylinders (12) each connected to the hydraulic pump (22) and a corresponding work implement (14), wherein each of the cylinders (12) have at least two hydraulic circuits (16,18) of a known area for receiving the fluid supply (28) and moving the cylinders (12), the method comprising:

applying the plurality of currents (52) to each of the hydraulic circuits (16,18), each of the currents having a different value;

sensing a position (54) of the cylinder (12) associated with each of the hydraulic circuits (16,18) in response to application of each of the currents;

determining the plurality of fluid flows (56) associated with each of the currents based on the position of the associated cylinder (12), on the known area of the hydraulic circuit (16,18), and on an average of fluid flow over selected current values for each of the hydraulic circuits (16,18) to account for hysteresis associated the hydraulic circuit (16,18);

determining a maximum fluid flow for each hydraulic circuit (16,18) from the plurality of fluid flows and a maximum overall fluid flow from all of the maximum fluid flows of all the hydraulic circuits (16,18);

determining the scaling factor (60) for each of the hydraulic circuits (16,18) based on the maximum fluid flow for the corresponding hydraulic circuit (16,18) and the maximum overall fluid flow for compensating the hydraulic circuit (16,18) for receiving less than maximum fluid flow from the pump (22);

receiving an input signal (62) representative of a desired amount of movement of at least two of the work implements (14);

determining a desired percentage of fluid flow (66) to each of the hydraulic circuits (16,18) associated with each of the cylinders (12) based on the desired amount of movement of the work implements (14) and the scaling factor of the corresponding hydraulic circuits (16,18); and controlling the amount of fluid flow (68) from the hydraulic fluid supply (28) to each of the hydraulic circuits (16,18) based on the corresponding desired percentage of fluid flow so as to allow for maximum fluid flow to each of the hydraulic circuits (16,18).

10. A method for controlling fluid flow from a hydraulic fluid supply (28) via a single hydraulic pump (22) in an electrohydraulic system having multiple hydraulic cylinders (12) each connected to the hydraulic pump (22) and a corresponding work implement (14), wherein each of the cylinders (12) have at least two hydraulic circuits (16,18) for receiving the fluid supply (28) and moving the cylinders (12), the method comprising:

determining a plurality of fluid flows (52,54,56) corresponding to a plurality of current values for each of the hydraulic circuits (16,18);

determining a maximum fluid flow for each hydraulic circuit (16,18) from the plurality of fluid flows and a maximum overall fluid flow from all of the maximum fluid flows of all the hydraulic circuits (16,18);

determining the scaling factor (60) for each of the hydraulic circuits (16,18) based on the maximum fluid flow for the corresponding hydraulic circuit (16,18), on the maximum overall fluid flow, and on a percentage of fluid flow for each of the fluid flows based on the maximum fluid flow for each of the hydraulic circuits (16,18) for compensating the hydraulic circuit (16,18) for receiving less than maximum fluid flow from the pump (22);

receiving an input signal (62) representative of a desired amount of movement of at least two of the work implements (14);

determining a desired percentage of fluid flow (66) to each of the hydraulic circuits (16,18) associated with each of the cylinders (12) based on the desired amount of movement of the work implements (14) and the scaling factor of the corresponding hydraulic circuits (16,18); and controlling the amount of fluid flow (68) from the hydraulic fluid supply (28) to each of the hydraulic circuits (16,18) based on the corresponding desired percentage of fluid flow so as to allow for maximum fluid flow to each of the hydraulic circuits (16,18) and by applying a current to the hydraulic circuit (16,18) based on the desired percentage of fluid flow and the current values associated with each of the determined percentages of fluid flows and performing an interpolation on the current values if the desired percentage of fluid flow falls between any two determined percentages of fluid flow.

11. A system (10) for controlling fluid flow from a hydraulic fluid (28) supply via a single hydraulic pump (22) in an electrohydraulic system having multiple hydraulic cylinders (12) each connected to the hydraulic pump (22) and a corresponding work implement (14), wherein each of the cylinders (12) have at least two hydraulic circuits (16,18), each of a known area, for receiving the fluid supply (28) and moving the cylinders (12), the system (10) comprising:

at least two input devices (34) for generating at least two corresponding input signals representative of a desired amount of movement of at least two of the work implements (14);

a controller (36), coupled to the input devices (34) and the hydraulic circuits (16,18), for determining a scaling factor for each of the hydraulic circuits (16,18) for compensating the hydraulic circuit for receiving less than maximum fluid flow from the pump (22), determining a desired percentage of fluid flow to each of the hydraulic circuits (16,18) associated with each of the cylinders (12) based on the desired amount of movement of the work implements (14) and the scaling factor of the corresponding hydraulic circuits (16,18), and controlling the amount of fluid flow from the hydraulic fluid supply to each of the hydraulic circuits (16,18) based on the corresponding desired percentage of fluid flow so as to allow for maximum fluid flow to each of the hydraulic circuits (16,18); and further wherein:

the controller (36), in determining each of the scaling factors, is further operative to determine a plurality of fluid flows corresponding to a plurality of current values and an average of fluid flow over selected current values for each of the hydraulic circuits (16,18) to account for hysteresis associated the hydraulic circuit and to apply the plurality of currents to each of the hydraulic circuits (16,18) wherein each of the currents have a different value, to determine a maximum fluid flow for each hydraulic circuit (16,18) from the plurality of fluid flows and a maximum overall fluid flow from all of the maximum fluid flows of all the hydraulic circuits (16,18), and to determine the scaling factor for each of the hydraulic circuits (16,18) based on the maximum fluid flow for the corresponding hydraulic circuit (16,18)and the maximum overall fluid flow; and the system (10) further comprising a position sensor (40) coupled to each of the cylinders (12) and the controller (36), for sensing a position of the cylinder (12) associated with each of the hydraulic circuits (16,18) in response to application of each of the currents and generating corresponding position signals, and wherein the controller (36) is further operative to determine the plurality of fluid flows associated with each of the currents based on the position of the associated cylinder (12) and the known area of the hydraulic circuit (16, 18).

12. A system (10) for controlling fluid flow from a hydraulic fluid (28) supply via a single hydraulic pump (22) in an electrohydraulic system having multiple hydraulic cylinders (12) each connected to the hydraulic pump (22) and a corresponding work implement (14), wherein each of the cylinders (12) have at least two hydraulic circuits (16,18) for receiving the fluid supply (28) and moving the cylinders (12), the system (10) comprising:

at least two input devices (34) for generating at least two corresponding input signals representative of a desired amount of movement of at least two of the work implements (14);

a controller (36), coupled to the input devices (34) and the hydraulic circuits (16,18), for determining a scaling factor for each of the hydraulic circuits (16,18) for compensating the hydraulic circuit for receiving less than maximum fluid flow from the pump (22), determining a desired percentage of fluid flow to each of the hydraulic circuits (16,18) associated with each of the cylinders (12) based on the desired amount of movement of the work implements (14) and the scaling factor of the corresponding hydraulic circuits (16,18), and controlling the amount of fluid flow from the hydraulic fluid supply to each of the hydraulic circuits (16,18) based on the corresponding desired percentage of fluid flow so as to allow for maximum fluid flow to each of the hydraulic circuits (16,18); and further wherein:

the controller (36), in determining each of the scaling factors, is further operative to determine a plurality of fluid flows corresponding to a plurality of current values for each of the hydraulic circuits (16,18), determine a maximum fluid flow for each hydraulic circuit (16,18) from the plurality of fluid flows and a maximum overall fluid flow from all of the maximum fluid flows of all the hydraulic circuits (16,18), determine the scaling factor for each of the hydraulic circuits (16,18) based on the maximum fluid flow for the corresponding hydraulic circuit (16,18)and the maximum overall fluid flow, and determine a percentage of fluid flow for each of the fluid flows based on the maximum fluid flow for each of the hydraulic circuits (16,18) and wherein the controller (36), in controlling the amount of fluid flow to each of the hydraulic circuits (16,18), is further operative to apply a current to the hydraulic circuit (16,18) based on the desired percentage of fluid flow and the current values associated with each of the determined percentages of fluid flows, and in applying the current, is further operative to perform an interpolation on the current values if the desired percentage of fluid flow falls between any two determined percentages of fluid flow.

13. A system for controlling fluid flow from a hydraulic fluid supply via a single hydraulic pump in an electrohydraulic system having multiple hydraulic cylinders each connected to the hydraulic pump and a corresponding work implement, wherein each of the cylinders have at least two hydraulic circuits for receiving the fluid supply and moving the cylinders, the system comprising:

at least two input devices for generating at least two corresponding input signals representative of a desired amount of movement of at least two of the work implements;

a controller, coupled to the input devices and the hydraulic circuits, for determining a scaling factor for each of the hydraulic circuits for compensating the hydraulic circuit for receiving less than maximum fluid flow from the pump, determining a desired percentage of fluid flow to each of the hydraulic circuits associated with each of the cylinders based on the desired amount of movement of the work implements and the scaling factor of the corresponding hydraulic circuits, and controlling the amount of fluid flow from the hydraulic fluid supply to each of the hydraulic circuits based on the corresponding desired percentage of fluid flow so as to allow for maximum fluid flow to each of the hydraulic circuits.

14. The system as recited in claim 13 wherein the controller, in determining each of the scaling factors, is further operative to determine a plurality of fluid flows corresponding to a plurality of current values for each of the hydraulic circuits, determine a maximum fluid flow for each hydraulic circuit from the plurality of fluid flows and a maximum overall fluid flow from all of the maximum fluid flows of all the hydraulic circuits, and determine the scaling factor for each of the hydraulic circuits based on the maximum fluid flow for the corresponding hydraulic circuit and the maximum overall fluid flow.

15. The system as recited in claim 14 wherein each of the hydraulic circuits has a known area, and wherein the controller, in determining the plurality of fluid flows, is further operative to apply the plurality of currents to each of the hydraulic circuits, wherein each of the currents having a different value, and wherein the system further comprising a position sensor, coupled to each of the cylinders and the controller, for sensing a position of the cylinder associated with each of the hydraulic circuits in response to application of each of the currents and generating corresponding position signals, and wherein the controller is further operative to determine the plurality of fluid flows associated with each of the currents based on the position of the associated cylinder and the known area of the hydraulic circuit.

16. The system as recited in claim 15 wherein the each of the cylinder further comprise a valve coupled to the corresponding hydraulic circuits and a solenoid coupled to the valve and the controller for causing the valve to move and allow fluid flow therein and wherein the controller, in applying the plurality of currents, is operative to apply the plurality of currents to each of the solenoids.

17. The system as recited in claim 15 wherein the controller, in controlling the amount of fluid flow, is further operative to receive the position signals of each of the cylinders as they move, and control the amount of fluid flow based on the position of each of the cylinders and the desired percentage of fluid flow to each of the hydraulic circuits associated with the cylinders.

18. The system as recited in claim 17 wherein the controller, in controlling the amount of fluid flow, is further operative to determine an actual flow of fluid to each of the hydraulic circuits based on the position of the cylinders, determine an actual percentage of fluid flow to each of the hydraulic circuits based on the actual flow and the total fluid flow to all of the hydraulic circuits, and compare the actual percentage of fluid flow of each of the hydraulic circuits with the corresponding desired percentage of fluid flow.

19. The system as recited in claim 14 wherein the controller, in determining the scaling factor, is further operative to determine a percentage of fluid flow for each of the fluid flows based on the maximum fluid flow for each of the hydraulic circuits and wherein the controller, in controlling the amount of fluid flow to each of the hydraulic circuits, is further operative to apply a current to the hydraulic circuit based on the desired percentage of fluid flow and the current values associated with each of the determined percentages of fluid flows.

20. The system as recited in claim 13 wherein each of the hydraulic circuits has a known area and wherein the controller, in determining the desired percentage of fluid flow, is further operative to determine a desired relative velocity for each of the cylinders to be moved based on the desired amount of movement of the work implements, and determine each of the desired percentages of fluid flow based on each of the relative velocities and the known area of each of the hydraulic circuits associated with the cylinders.

21. The system as recited in claim 20 wherein the controller, in determining each of the desired relative velocities, is further operative to determine a desired velocity for moving each of the cylinders associated with the work implements based on the desired amount of movement, and determine the relative velocities based on each of the desired velocities and a total desired velocity for moving all of the cylinders.

* * * * *